United States Patent [19]

Montino et al.

[11] Patent Number: 4,803,064

[45] Date of Patent: Feb. 7, 1989

[54] PROCESS FOR PREPARING TITANIUM DIOXIDE IN THE FORM OF SPHERICAL PARTICLES BY HYDROLYSIS OF TI(IV)

[75] Inventors: Franco Montino, Novara; Giuseppe Spoto, Turin, both of Italy

[73] Assignee: Montedison S.p.A., Milan, Italy

[21] Appl. No.: 95,611

[22] Filed: Sep. 11, 1987

[30] Foreign Application Priority Data

Sep. 16, 1986 [IT] Italy .................. 21710 A/86

[51] Int. Cl.$^4$ .................................. C01G 23/053
[52] U.S. Cl. ...................... 423/612; 423/82; 423/85; 423/616
[58] Field of Search ............. 423/610, 615, 616, 85, 423/82, 612

[56] References Cited

U.S. PATENT DOCUMENTS

| | | | |
|---|---|---|---|
| 3,719,748 | 3/1973 | Manfroy et al. | 423/610 |
| 3,859,212 | 1/1975 | Smalley et al. | 423/616 |
| 3,959,465 | 5/1976 | Kurata et al. | 423/610 |
| 4,010,242 | 3/1977 | Iler et al. | 423/608 |
| 4,241,042 | 12/1980 | Matijevic et al. | 423/610 |
| 4,268,422 | 5/1981 | Becker et al. | 423/615 |
| 4,574,078 | 3/1986 | Cortesi et al. | 423/610 |
| 4,627,966 | 12/1986 | Micheli | 423/610 |
| 4,675,251 | 6/1987 | Matijevic et al. | 428/404 |

FOREIGN PATENT DOCUMENTS 0117755 9/1984 European Pat. Off.
11859A06 5/1977 U.S.S.R.

OTHER PUBLICATIONS

Catone and Matijevic, "Aluminum Hydrous Oxide Sols-II. Preparation of Uniform Spherical Particles by Hydrolysis of Al Sec-Butoxide", Journal of Colloid and Interference Science, vol. 48, No. 2, Aug. 1974.

Brace & Matijevic, "Aluminum Hydrous Oxide Sols-I--Spherical Particles of Narrow Size Distribution," J. Inorg. Nucl. Chem, 1973, vol. 35, pp. 3961-3705.

Review of Common Methods of Particle Size Measurement, vol. 47, No. 604, May 1975, pp. 35-56.

Polyelectrolyte Determination at Low Concentration, Ind. Eng. Chem. Prod. Res. Dev., vol. 4, 1975, pp. 312-315.

Preparation and Mechanism of Formation of Titanium Dioxide Hydrosols of Narrow Size Distribution, Journal of Colloid, etc., vol. 61, No. 2, Sep. 1977, pp. 302-311.

Primary Examiner—Robert L. Stoll
Assistant Examiner—Paige C. Harvey
Attorney, Agent, or Firm—Stevens, Davis, Miller & Mosher

[57] ABSTRACT

A process for preparing titanium dioxide in the form of spherical particles having the particle size distribution indicated by dw/dn≦2, by hydrolysis of strongly acid solutions of Ti(IV), wherein the molar ratio $SO_4^=$/Ti(IV) is at least 1.5, and in the presence of cationic polyelectrolytes having a molecular weight higher than 1 million and a ionicity of at least 3 milliequivalents per gram.

14 Claims, 4 Drawing Sheets

1 μm

1 μm

1 μm

1 μm

1 μm

1 μm

1 μm

PROCESS FOR PREPARING TITANIUM DIOXIDE IN THE FORM OF SPHERICAL PARTICLES BY HYDROLYSIS OF TI(IV)

FIELD OF THE INVENTION

The present invention relates to a process for preparing hydrated titanium dioxide in the form of non agglomerated spherical particles having sizes below 1 micron or higher than 1 μm up to a value of 1.5 μm.

In particular, the invention relates to the preparation of hydrated titanium dioxide starting from aqueous solutions comprising Ti(IV) ions by means of hydrolysis.

In particular, by the process of the invention it is possible to achieve a homogeneous precipitation by hydrolysis of strongly acid solution by means of ageing at high temperatures.

Homogeneous precipitation means a precipitation which occurs in a solution in which every local supersaturation phenomenon is drastically reduced.

Titanium dioxide has a wide range of uses for example as pigment, catalyst or photoconductor.

BACKGROUND OF THE INVENTION

It is generally known that particle size distribution, morphology and agglomeration of the titanium dioxide particles strongly influence the properties of the obtained pigments.

U.S. Pat. No. 4,241,042 discloses a method of preparing titanium dioxide, having the above-mentioned characteristics, via aerosol, which comprises preparing a liquid aerosol of a hydrolizable Ti(IV) compound, and reacting, in a subsequent step, the resulting aerosol with water vapor in order to obtain hydrated dioxide which, after drying at a temperature of 120°–130° C., is converted to the crystalline phase anatase; if subjected to higher temperatures, of the order of 1100° C., it is converted to rutile.

This method permits to obtain a titanium dioxide with good properties, particularly if a nucleating agent such as AgCl is used.

An alternative method, always via aerosol, which permits to avoid the mixing step, is described in U.S. Pat. No. 4,574,078.

These methods lead to good results, but involve of course the formation of an aerosol which, as is well known, requires exactly controlled conditions to provide a titanium dioxide having the above-described characteristics.

A method of preparing a titanium dioxide having the aforesaid characteristics through an alternative process, i.e. homogeneous precipitation, is described in "Preparation and Mechanism of Formation of Titanium Dioxide Hydrosols of Narrow Size Distribution", E. Matijevic, M. Budnik and L. Meites in "Journal of Colloid and Interface Science" Vol. 61, (2), 1977.

The process consists in subjecting to hydrolysis at a temperature of about 100° C., TiCl$_4$ solutions which are acid due to HCl, in the presence of sulphate ions.

Said process, however is affected by the drawback of a very low productivity, as it requires very long times, of the order of a few days.

Thus, a commercial-scale process cannot be carried out on the basis of said operative technique.

There was the strong requirement of having available a homogeneous precipitation technique, which should permit to obtain a titanium dioxide with the abovesaid characteristics and with a high productivity.

THE PRESENT INVENTION

It has now surprisingly been found that it is possible to prepare titanium dioxide in the form of non agglomerated spherical particles, either monodispersed or polydispersed with a low polydispersion index, by means of methods operating in wet conditions, and with a very high productivity.

Thus, it is an object of the present invention to provide a process for preparing hydrated titanium dioxide in the form of spherical particles, having a polydispersion index indicated by $dw/dn \leq 2$, in particular $\leq 1.20$ (monodispersed particles), wherein $dw$ is the weighed average diameter of the particles and $dn$ is the average linear diameter, by hyhydrolysis of aqueous solutions, of Ti(IV) and SO$_4$ ions, which are strongly acid due to HCl or H$_2$SO$_4$ in which the SO$_4^=$/Ti(IV) molar ratio is at least equal to 1.5, and operating in the presence of cationic polyelectrolytes, which are soluble under the reaction conditions and have an average molecular weight higher than 1 million and a ionicity of at least 3 milliequivalents/g (meq/g), said hydrolysis being carried out in such conditions as to obtain a homogeneous precipitation of titanium dioxide.

Generally, the concentration of Ti(IV) in the starting solution varies from 0.05 moles/l to 0.25 moles/l, preferably from 0.1 to 0.2 moles/l.

Preferably, the cationic polyelectrolytes have a ionicity higher than 3.5 meq/g and a molecular weight ranging from 3 to 6 millions.

It has been found that the results according to the invention are not obtained if anionic polyelectrolytes are used having the same combination of ionicity and molecular weight as indicated for the cationic polyelectrolytes.

Analogously, the results of the invention are not obtained by using polymers having the indicated molecular weight, but comprising only neutral non-ionic repeating units. The polyelectrolytes of the invention are utilized in amounts higher than 3% by weight with respect to the theoretic amount of TiO$_2$ corresponding to the starting Ti(IV) present in the solution.

Polyelectrolyte amounts higher than 4% by weight, in particular of 5.5% by weight, are preferably used.

Before use, the polyelectrolytes of the invention are preferably dissolved in water at concentrations of a few g/l, generally of the order to 1 or 2 g/l.

It is possible to use higher polyelectrolyte amounts than the indicated ones, for example of the order of 10 or 20% by weight, without obtaining appreciable variations as regards the morphology and the size distribution of the particles.

It has been found that concentrations of ionic groups corresponding to at least 3 meq/g are the ones which provide the best results. Preferably, the amount of cationic groups is higher than 4 meq/g.

The ionicity of the cationic polyelectrolyte is quantitatively determined according to known methods, using an anionic polyelectrolyte as a titrating agent. The method utilized in the present invention is described in "Polyelectrolyte Determination at Low Concentration" L. K. Wang and W. W. Shuster, Ind. Eng. Chem. Produc. Res. Dev., Vol. 14, No. 4, 1975, pages 312–314, and it permits to calculate the milliequivalents per gram (meq/g) of positive charge which is present in the electrolyte.

The anionic polyelectrolyte utilized as a titrating agent is a commercial product, designated as PVSAK, consisting of the potassium salt of the polyvinylsulphonic acid.

Furthermore it has been found that the less highly branched the structure of the polyelectrolyte, the higher are the polyelectrolyte performances. The molecular weight being equal, a polyelectrolyte having a branched structure exhibits a lower activity. However, also ationic branched polyelectrolyte are useful, provided they are soluble under the reaction conditions and are utilized in a higher amount.

The polyelectrolytes which have proved to be particularly suited to the process of the present invention are polymers comprising repeating units based on substituted acrylamide and having the general formula:

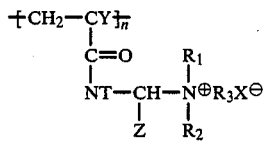

wherein $R_1$, $R_2$, $R_3$, T are equal to or different from one another and are selected from H, an aliphatic hydrocarbon radical with 1 to 4 carbon atoms;

Y is H or —$CH_3$;
Z is H or —$CH_3$;
X is an anion, in particular chloride or sulphate;
n is an integer.

The polymers comprising the above-indicated units are prepared from non-ionic polyacrylamide by means of known reactions, for example by the Mannich reaction.

Further utilizable cationic polyelectrolytes are the polyvinylamines, which are obtainable from the polyacrylamides through the Hoffman degradation reaction and subsequent quaternization of the nitrogen atom, according to conventional techniques, or by polymerization, according to known processes, of the vinylamines and subsequent quaternization of nitrogen, said polyvinylamines having the general formula:

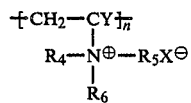

wherein $R_4$, $R_5$, $R_6$ can be defined as $R_1$ indicated hereinbefore, X, Y and n are the same as defined hereinbefore.

The preferred compounds are those in which: Y, Z, T, $R_3$ and $R_4$ are H and $R_1$, $R_2$, $R_5$, $R_6$ are like or different from one another and are selected from H, —$CH_3$, or —$C_2H_5$.

The polymers which comprise the above-indicated cationic units ca1 also contain neutral units of the non-substituted acrylamide having general formula:

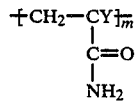

where m is an integer and Y is the same as already defined.

The neutral and cationic units are statistically distributed along the polymer chain, the ionicity and the molecular weight having the indicated values.

However, it is possible also to use copolymers in which the neutral unit can be selected from the following classes:

in which R=H, or an aliphatic hydrocarbon radical containing 1 to 4 carbon atoms;

in which $R_7$ is the same as R;

in which $R_8$ is the same as R;

in which $R_9$ and $R_{10}$ are the same as R;

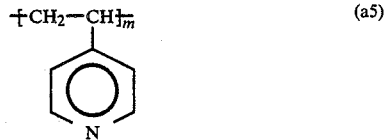

m in the various classes being the same as defined above.

The copolymers containing the cationic units of acrylamide and the indicated neutral groups are prepared according to processes of the art.

In particular, the polymers comprising the specified ionic units and the groups of class a1) are obtained through polymerization of an olefin $CH_2$=CHR with acrylamide; the ones of class (a2) through polymerization of acrylamide with an acrylic acid ester; the ones of class (a3) through copolymerization of vinylether with acrylamide; the ones of class (a4) through copolymerization of maleic acid with acrylamide; the ones of class (a5) through copolymerization of acrylamide with vinylpyridine.

The various neutral units indicated in the various groups can be also simultaneously present in the polymeric chain in the event that a plurality of monomers should be contemporaneously polymerized, the previously indicated molecular weight value and ionicity value being in any case maintained.

The combination of the various radicals appearing in the above-reported neutral and cationic groups are always selected so as to provide polymers which are soluble under the condition of use conforming to the present invention.

Particularly preferred, within the various classes, are the hydrocarbon radicals with 1 or 2 carbon atoms.

The polyelectrolytes of the class of the polyacrylamides are commercial products designated as Ecoclar, Praestol, Separan and available both in the solid state and as emulsions. Examples of preferred polyelectrolytes are Ecoclar 8337 or 8032 or 8017, Praestol 444K or 555K.

Preferably they are utilized by preparing aqueous solutions of the commercial polyelectrolyte at concentrations of 1-2 g/l at the moment of their use and by drawing the necessary amount. In fact, the aqueous solutions of these polyelectrolytes are stable for a short time, generally for no longer than a few days.

The hydrolysis reaction is conducted at high temperatures; it is preferable to operate at temperatures ranging from 90° C. to the boiling temperature of the starting solutions in order to complete the precipitation in very short times.

Under these conditions, the times required for an almost quantitative precipitation of titanium dioxide are of a few hours, generally they range from 1 hour to 4 hours.

It is possible to operate at atmospheric pressure or below the atmospheric pressure; in the latter case, the times are further reduced.

The titanium (IV) salt may be a sulphate or a chloride, titanium tetrachloride being preferably utilized.

The titanium dioxide obtained by the process of the invention appears in the anatase phase in the X-ray powder spectrum.

Rutile titanium dioxide having the same morphology and the same particle size distribution as the anatase titanium dioxide of the invention is obtainable by subjecting the latter to heat treatments according to conventional processes. In particular it has been found that already at 900° C. it is possible to obtain the rutile crystalline phase.

Average sizes (dw and dn) as well as morphological and granulometric characteristics are determined under an electronic microscope by the TEM technique. The method of determining dw and dn is described by E. A. Collins, J. A. Davidson and C. A. Daniels in "Keview of Common Methods of Particles Size Measurement", Journal of Paint Technology, vol. 47, No. 604, May 1975.

The hydrated $TiO_2$ obtained by the process of the present invention has diameters ranging from 0.2 to 1.5 $\mu m$.

The pH of the solution is strongly acid due to HCl or $H_2SO_4$. The sulphate ions absolutely necessary for the process of the invention come either from $H_2SO_4$ or from a soluble salt thereof, for example sodium sulphate.

In particular, when the utilized titanium salt is $TiCl_4$ and the Ti(IV) concentration is 0.17M, the preferred ratios are as follows:

$$[HCl]/[Ti(IV)]=12, [SO_4^=]/[Ti(IV)]=2.4;$$

the cationic polyelectrolyte is 5.5% by weight with respect to the theoretical $TiO_2$ and the hydrolysis time varies from 1 hour to 5 hours.

Under such conditions, a suspension of spheroidal particles with an average diameter of about 0.43 $\mu m$ is obtained. The product is separated from the mother liquors by centrifugation.

Everyone skilled in the art will be able in any case to easily determine the best conditions as a function of the starting Ti(IV) concentration.

The following examples are given merely to illustrate the present invention, without being however a limitation thereof.

EXAMPLE 1

13.2 ml of $H_2SO_4$ (96%) and then 11.2 ml of $TiCl_4$ (98%) were added gradually and under stirring to 100.2 ml of HCl (37%), so obtaining a solution, which was subsequently poured into 450 ml of $H_2O$, in which 0.45 g of Ecoclar 8017 had been dissolved by means of prolonged stirring. The final volume was brought to 600 ml with distilled water, so obtaining a limpid and colourless solution. Under these conditions, [Ti(IV)]=0.17M, [HCl]/[Ti(IV)]=11.9, [$H_2SO_4$ ]/[Ti(IV)]=2.4, while Ecoclar represented 5.5% by weight referred to the theoretical amount of $TiO_2$.

The strongly acid solution of Ti(IV) ions was then poured into a 1-liter flask equipped with a reflux cooler, was heated to 104° C. and maintained at this temperature for 1.5 hours without stirring.

Already after a 5-minute heating to 100° C. a slight opalescence could be observed, the intensity of which was rapidly increasing.

At the end of the test, the resulting milky suspension was centrifuged and the product separated therefrom was washed with distilled water and dried in over at 120° C.

Figure 1:
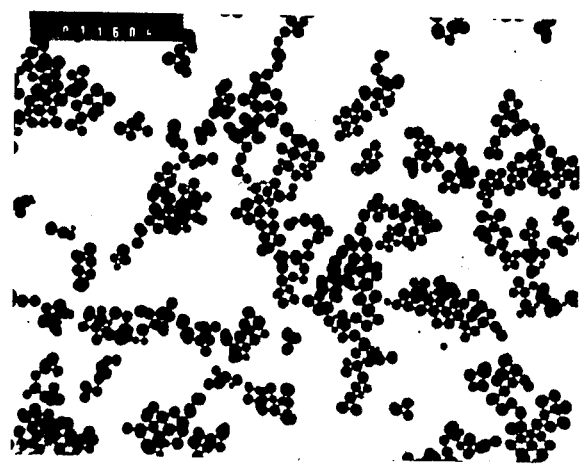
FIG. 1 shows the x-ray diffraction (enlargement 4580X) pattern of the product in example 1.

Obtained were 6.54 g of product, which on TEM analysis revealed to be composed of spherical particles having an average diameter of about 0.4 $\mu m$ and a narrow size distribution (FIG. 1, enlargement of 4580 X). The X-ray diffraction spectrum showed that $TiO_2$ was in the anatase form.

EXAMPLE 2 (comparative test)

The test of example 1 was repeated, with the only exception that no polyelectrolyte was used. After a 90-minute heating 104° C. the solution exhibited only a very slight opalescence. After further 90 minutes at the same temperature, the amount of product recoverable by centrifugation was very low and the product resulted (on TEM analysis) to be composed of irregular particles, which did not exhibit a spherical morphology.

EXAMPLE 3 (comparative test)

The test of example 1 was repeated in the absence of HCl and operating as follows:

11.2 ml of $TiCl_4$ were added to 13.2 ml of $H_2SO_4$ in 50 ml of distilled water.

The limpid solution so obtained was poured into 500 ml of $H_2O$, in which 0.45 g of Ecoclar 8017 had been dissolved. The volume was brought to 600 ml with distilled water while simultaneously heating the solution in a 1-liter flask equipped with a reflux cooler.

Figure 2:
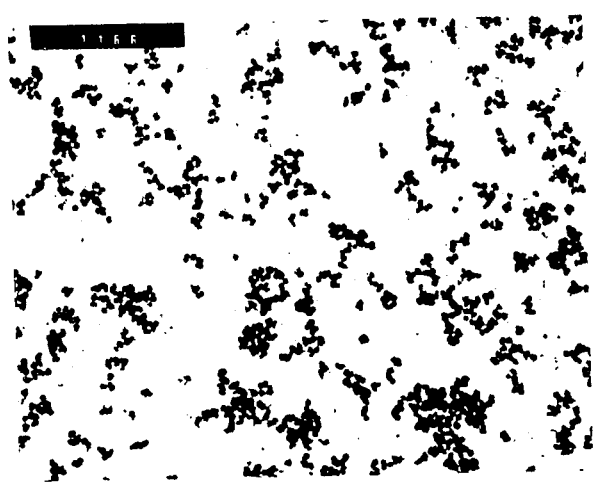
FIG. 2 shows the TEM (enlargement 4580X) of the product in example 3.

Already at 80° C. a precipitate began to form. After 90 minutes at 100° C. the formed precipitate, which decanted without difficulty, was filtered, washed with 200 ml of distilled water and dried in over at 120° C. There were obtained 7 g of product composed of particles, which did not exhibit a spherical morphology. FIG. 2 shows a photograph under the transmission electron microscope (enlargement of 4580 X).

EXAMPLE 4

To a solution prepared by dissolving 0.45 g of Ecoclar 8017 in 450 ml of distilled water there were added 46.7 ml of $H_2SO_4$ (96%), 11.2 ml of $TiCl_4$ and distilled water in order to bring the final volume to 600 ml. The resulting solution appeared turbid and became limpid by means of heating to 100° C. After 10 minutes at 103° C. a slight opalescence appeared, the intensity of which was rapidly increasing.

Figure 3:
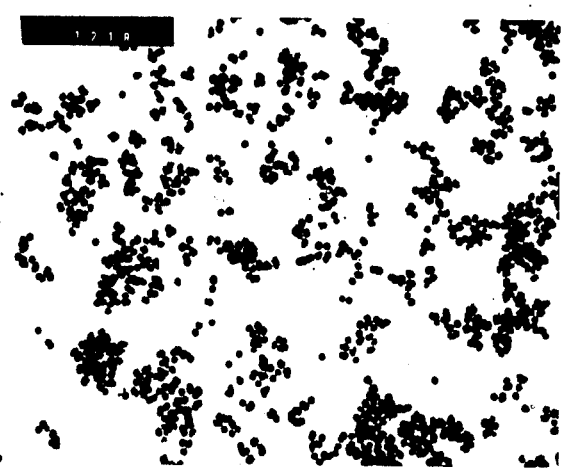
FIG. 3 shows the TEM (enlargement 4580X) of the product in example 4.

After 90 minutes at such temperature, the precipitate was recovered by filtration, washed with 200 ml of distilled water and dried in over at 120° C. Obtained were 8 g of $TiO_2$, a photograph of which, obtained under the TEM (enlargement of 4580 x), is shown in FIG. 3.

EXAMPLE 5 (comparative test)

The test described in example 1 was repeated with the same modalities, but in the absence of $H_2SO_4$. After a 90-minutes heating, the solid was separated by centrifugation and washed with distilled water.

Figure 4:
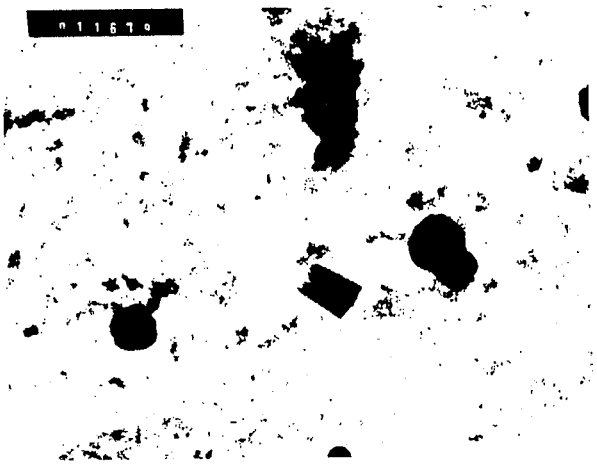
FIG. 4 shows the TEM (enlargement 4580X) of the product in example 5.

On TEM analysis (FIG. 4, enlargement of 4580 X) it resulted to be composed of particles, which did not exhibit a defined morphology.

EXAMPLE 6

Figure 5:
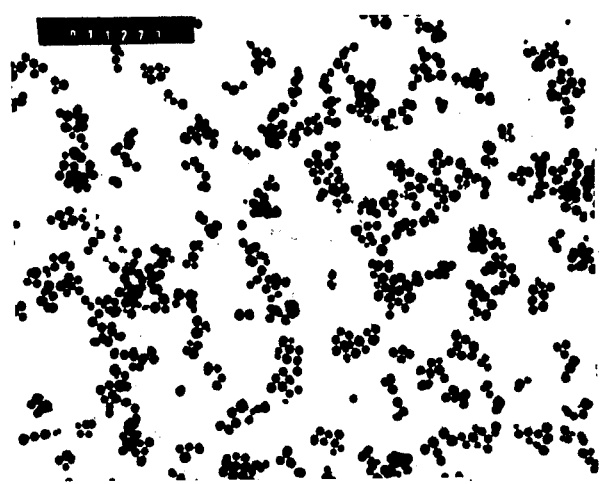
FIG. 5 shows the TEM (enlargement 4580X) of the product in example 6.

It was operated according to the same modalities as in example 1, but using 0.6 g of Ecoclar 8032. There were obtained 6.87 g of $TiO_2$ consisting of spherical particles having an average diameter of 0.3 $\mu$m (FIG. 5, enlargement of 4580 X). The dw/dn ratio, measured as is described above, was of 1.38.

EXAMPLE 7

The test of the preceding example was repeated, except that 0.6 g of Praestol 444K were used.

The product obtained exhibited characteristics which were similar to those of example 6.

EXAMPLE 8

Operating according to the same modalities and with the same concentrations as in example 6, the reaction kinetics was followed by drawing product samples after heating times of 90, 180 and 300 minutes. The TEM analysis did not reveal variations in the morphology and particle size depending on the heating time.

EXAMPLE 9

The starting $TiCl_4$ concentration was brought to 0.25 moles/l, but leaving unchanged the ratios with respect to the other reagents. To this purpose there were utilized 16.5 ml of $TiCl_4$, 147 ml of HCl, 19.4 ml of $H_2SO_4$ and 0.66 g of Ecoclar 8017. Operating as in example 1 required therefore a 23-minute heating to 100° C. in order to cause opalescence to appear.

Figure 6A:
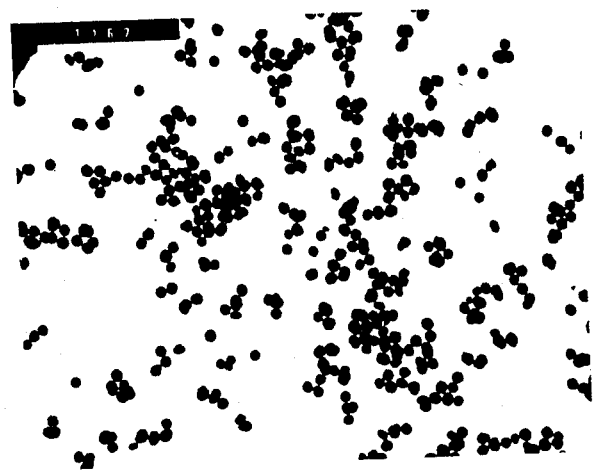
FIG. 6a and b show the TEM (enlargement 4580X) of the products in example 9.
Figure 6B:
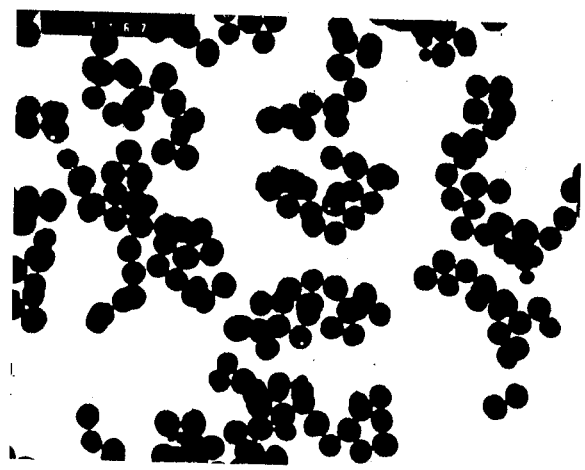

The product obtained after 90 minutes at such temperature did not exhibit substantial differences as compared with the one obtained in the test of example 1 (FIG. 6a, enlargement of 4580 X). If heating is conducted for 300 minutes, the diameter of the product particles is doubled (FIG. 6b, enlargement of 4580 X).

EXAMPLE 10

5 g of the sample obtained from the test described in example 1 were subjected to heat treatment at 900° C. for 4 hours. On X-ray analysis, the final product resulted to consist of $TiO_2$ rutile and did not differ as to morphology and granulometry from the precursor (anatase of example 1).

What we claim is:

1. A process for preparing titanium dioxide in the form of spherical particles having diameters ranging from 0.2 to 1.5 $\mu$m and a polydispersion index dw/dn$\leq$2, wherein dw is the average weighed diameter and dn is the average linear diameter of the particles, by hydrolysis of aqueous solutions, strongly acid due to HCl or $H_2SO_4$, of Ti(IV) and $SO_4=$ions, in which the $SO_4=$/Ti(IV) ratio is at least higher than 1.5, in the presence of cationic polyelectrolytes, having an average molecular weight higher than 1 million and a ionicity of at least 3 milliequivalents per gram (meq/g).

2. The process of claim 1, wherein the polydispersion index dw/dn is $\leq$1.20.

3. The process of claim 1, wherein the Ti(IV) in the aqueous solution has a concentration ranging from 0.05 to 0.25 moles/l.

4. The process of claim 1, wherein the Ti(IV) in the aqueous solution has a concentration ranging from 0.1 to 0.2 moles/l.

5. The process of claim 1, wherein the cationic polyelectrolytes have a ionicity higher than 3.5 meq/g and an average molecular weight higher than 3 million.

6. The process of claim 1, wherein the cationic polyelectrolyte is present in amounts higher than 3% by weight with respect to a theoretical titanium dioxide amount corresponding to the Ti(IV) ions present in the solution.

7. The process of claim 1, wherein the cationic polyelectrolyte comprises repeating units based on substituted acrylamide having general formula:

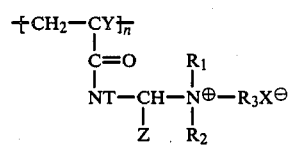

wherein $R_1$, $R_2$, $R_3$, t are equal to or different from one another and are selected from hydrogen, a hydrocarbon radical with 1 to 4 carbon atoms, Z, Y are -$CH_3$, H, X is an anion, n is an integer.

8. The process of claim 7, wherein Y, Z and $R_3$ are H, and $R_1$ and $R_2$ are equal to or different from each other, and are selected from H, —$CH_3$ and —$C_2H_5$.

9. The process of claim 1, wherein the cationic polyelectrolyte comprises repeating units based on vinylamine having general formula:

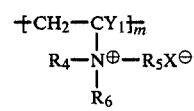

wherein $R_4$, $R_5$, $R_6$ are the same as $R_1$ defined hereinabove, $Y_1$ is the same as Y, and m is the same as n.

10. The process of claim 9, wherein $R_4$ is H, and $R_5$ and $R_6$ are equal to or different from each other and are selected from H, $-CH_3$, $-C_2H_5$.

11. The process of claim 7, wherein the polyelectrolyte comprises, besides the repeating units of claim 7, also neutral units of non-substituted acrylamide having the general formula:

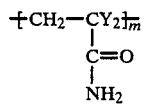

wherein m and $Y_2$ are the same as Y and n; the ionic units and the neutral units being statistically distributed in the polyelectrolyte.

12. The process of claim 7, wherein the cationic polyelectrolyte consists of a copolymer comprising the repeating units of claim 7, indicated hereinbefore and neutral units other than those of acrylamide, statistically distributed in the polyelectrolyte.

13. The process of claim 12, wherein the neutral units are selected from the following classes:

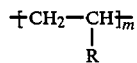 (a1)

wherein R is H or a hydrocarbon radical with 1 to 4 carbon atoms;

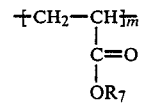 (a2)

wherein $R_7$ is the same as R;

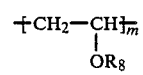 (a3)

wherein $R_8$ is the same as R;

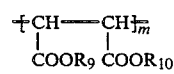 (a4)

wherein $R_9$ and $R_{10}$ are the same as R;

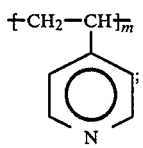

m in the above classes being an integer.

14. The process of claim 1, wherein the hydrolysis is carried out at temperatures ranging from 90° C. to the boiling temperature of the aqueous solution.

* * * * *